United States Patent
Pham

(10) Patent No.: US 8,656,439 B2
(45) Date of Patent: *Feb. 18, 2014

(54) METHOD AND SYSTEM FOR REGION-BASED MONITORING OF VIDEO ASSETS

(71) Applicant: AT&T Intellectual Property I, L.P., Atlanta, GA (US)

(72) Inventor: Hung John Pham, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,018

(22) Filed: May 20, 2013

(65) Prior Publication Data

US 2013/0265441 A1  Oct. 10, 2013

Related U.S. Application Data

(63) Continuation of application No. 12/873,109, filed on Aug. 31, 2010, now Pat. No. 8,458,757.

(51) Int. Cl.
*H04N 7/173* (2011.01)
*H04N 17/00* (2006.01)
*G06K 9/46* (2006.01)

(52) U.S. Cl.
USPC ............ 725/107; 725/119; 348/180; 348/192

(58) Field of Classification Search
USPC ............ 725/107, 119; 348/180, 192; 382/236
See application file for complete search history.

(56) References Cited

U.S. PATENT DOCUMENTS

| | | | |
|---|---|---|---|
| 6,965,895 B2 | 11/2005 | Smith et al. | |
| 7,120,676 B2 * | 10/2006 | Nelson et al. | 709/218 |
| 7,424,160 B1 * | 9/2008 | Basse | 382/236 |
| 7,945,899 B2 * | 5/2011 | Rovang | 717/124 |
| 8,001,236 B2 * | 8/2011 | Shivaji-Rao et al. | 709/224 |
| 8,073,287 B1 * | 12/2011 | Wechsler et al. | 382/278 |
| 2003/0061212 A1 | 3/2003 | Smith et al. | |
| 2007/0074255 A1 * | 3/2007 | Morioka | 725/78 |
| 2008/0301588 A1 | 12/2008 | Kumar et al. | |
| 2009/0060027 A1 | 3/2009 | Ferguson | |
| 2010/0097070 A1 | 4/2010 | Crick | |
| 2010/0235506 A1 * | 9/2010 | Barrett et al. | 709/225 |
| 2011/0088070 A1 | 4/2011 | Pham et al. | |
| 2011/0090346 A1 | 4/2011 | Pham et al. | |
| 2011/0134931 A1 | 6/2011 | Merwe et al. | |

* cited by examiner

*Primary Examiner* — Jason J Chung
*Assistant Examiner* — Sumaiya A Chowdhury
(74) *Attorney, Agent, or Firm* — Jackson Walker L.L.P.

(57) ABSTRACT

A method and system for monitoring video assets provided by a multimedia content distribution network (MCDN) includes an expert test monitoring platform (ETMP) configured to emulate MCDN client systems at a facility of an MCDN service provider. The ETMP may be used to test monitor MCDN performance by acquiring a baseband video signal and performing a test operation including at least one check point condition. The check point condition may be associated with a masked region of the video signal and may also involve a test of an audio channel. A plurality of test operations and/or check point conditions may be defined and executed on the baseband video signal, while the results of the test operation may be logged.

20 Claims, 7 Drawing Sheets

METHOD AND SYSTEM FOR REGION-BASED MONITORING OF VIDEO ASSETS

The present patent application is a continuation of U.S. patent application Ser. No. 12/873,109, filed Aug. 31, 2010, the entirety of which is hereby incorporated by reference.

BACKGROUND

1. Field of the Disclosure

The present disclosure relates to baseband video monitoring, and in particular to testing and monitoring of baseband video assets.

2. Description of the Related Art

Users of a multimedia content distribution network (MCDN) may be provided a wide range of video assets to select from. A service provider operating the MCDN may be faced with various quality control issues related to the video assets and the performance of MCDN equipment. In a conventional MCDN architecture, feedback about MCDN performance may only be available via information gleaned from user support requests and/or costly support visits to user locations.

DESCRIPTION OF THE EMBODIMENT(S)

Figure 1:
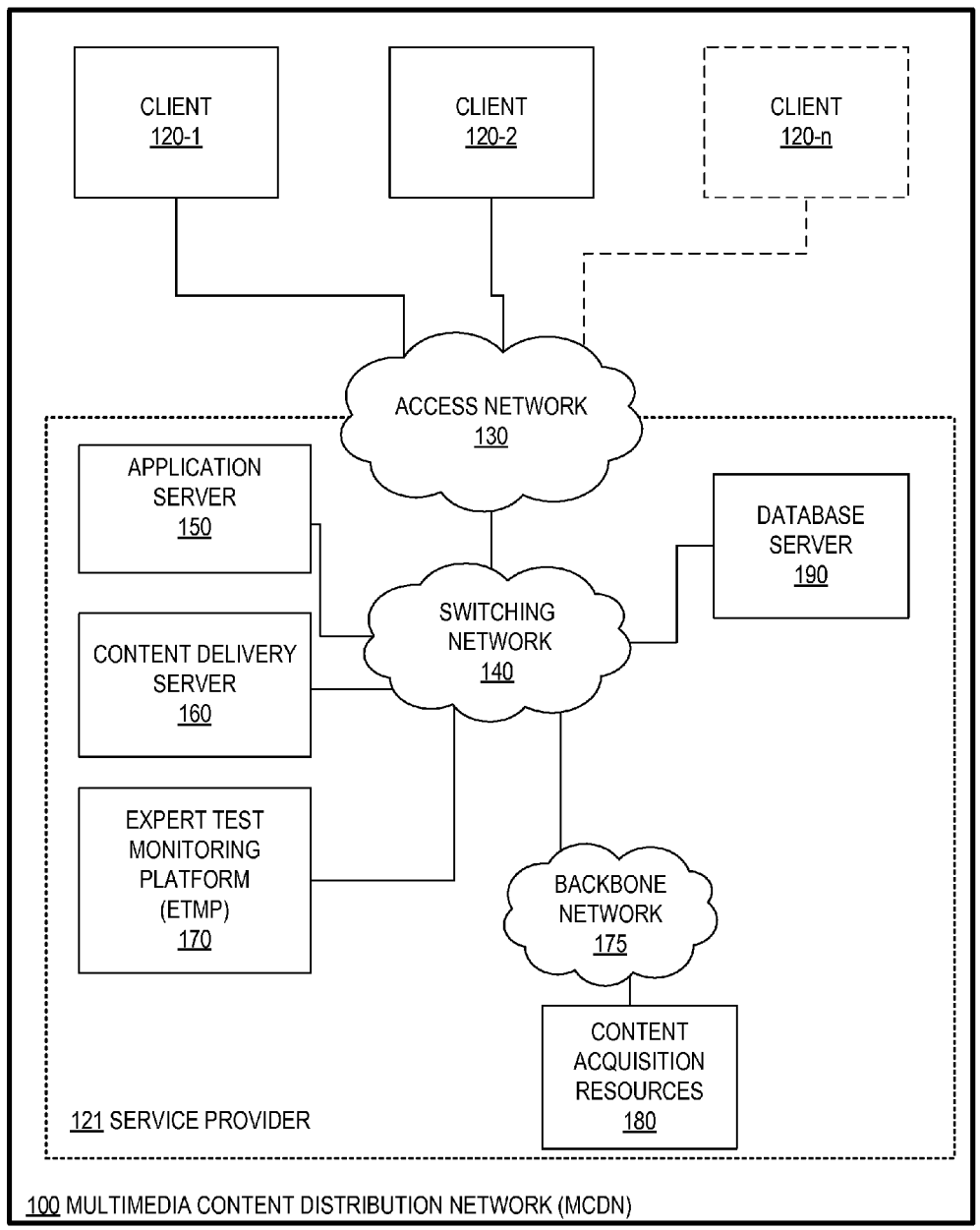
FIG. 1 is a block diagram of selected elements of an embodiment of an MCDN.

In one aspect, a disclosed method for test monitoring an output channel of an MCDN includes acquiring, at a predetermined frame rate, a selected baseband video signal output by an MHD configured as a terminal device of the MCDN, selecting an image in a series of frame images, and applying a predetermined image mask to the selected image. The series of frame images may be generated according to the frame rate. As a result of applying the image mask, a masked portion of the selected image may be isolated. The method may also include testing the masked portion for a given video check point condition, by, for example, comparing the masked portion to a predetermined image, an expected image, or a known image to determine the extent of similarity, and evaluating the extent of similarity against a predetermined threshold.

In certain embodiments, based on results of said testing the masked portion, the method may further include executing at least one of: a video pass script and a video fail script, and generating a video test log of the results and of said executing. The MHD may be one of a plurality of units under test (UUT) at an ETMP facility. The method may further include requesting, from an ETMP master controller, access to the MHD as an active UUT, controlling power supplied to the active UUT by sending a first network command to a network-based power controller, and selecting the baseband video signal by sending a second network command to generate a remote control signal instructing the active UUT to output an MCDN channel. The baseband video signal may be routed from the MHD using a video matrix switch coupled to the plurality of UUTs. The method may still further include sending a network command to the video matrix switch to route the baseband video signal from the active UUT.

In particular embodiments, the method may also include acquiring, at a predetermined sampling rate, at least one audio track generated by the MHD and corresponding to the selected baseband video signal, and testing a portion of the audio data for a given audio check point condition. Audio data according to the sampling rate may be generated during said acquiring. Based on results of said testing the portion of the audio data, the method may also include executing at least one of: an audio pass script and an audio fail script. The method may still further include generating an audio test log of the results and of said executing.

In a further aspect, a disclosed computerized test system for test monitoring output channels from an MCDN includes a processor coupled to first memory media and a network adapter accessible to the processor. The first memory media may include processor executable instructions to retrieve an ETMP test program from an ETMP database. The ETMP may include a plurality of MHDs configured to output MCDN program channels, and an ETMP network coupled to the network adapter and the ETMP database. The processor executable instructions may further be executable to execute the ETMP test program, and store recorded results of the executed ETMP test program in the ETMP database. The ETMP test program may include instructions executable by the processor to: select one of the plurality of MHDs, acquire, at a predetermined frame rate, a selected baseband video signal output by the selected MHD, select an image in a series of frame images, apply a predetermined image mask to the selected image, test a masked portion for a given video check point condition, and record the results of said instructions to test the masked portion. The series of frame images may be generated according to the frame rate. The masked portion of the selected image may be isolated when the image mask is applied.

In particular embodiments, the ETMP test program may further include instructions executable by a processor to acquire, at a predetermined sampling rate, at least one audio track generated by the selected MHD and corresponding to the selected baseband video signal, test a portion of the audio data for a given audio check point condition, and record the results of said instructions to test the portion of the audio data. Audio data according to the sampling rate may be generated when the at least one audio track is acquired. The first memory media may further include processor executable instructions to request, via a network command sent to an ETMP master controller, access to the selected MHD, wherein the ETMP master controller is coupled to the ETMP network.

In certain embodiments, the first memory media further include processor executable instructions to receive user input to generate a new ETMP test program, the user input including at least one of: first input associated with the frame rate, second input associated with an MCDN channel for selecting the baseband video signal, third input associated with the image mask, fourth input associated with a duration of the series of frame images, fifth input associated with the video check point condition, and sixth input associated with the results of said instructions to test the masked portion. The fifth input may specify a presence or an absence of a dynamic series of frame images. The fifth input may also specify a presence or an absence of a static series of frame images. The user input may further include any one or more of: seventh input associated with the predetermined sampling rate, eighth input associated with a number of acquired audio track(s), ninth input associated with a duration of the portion of the audio data, tenth input associated with the audio check point condition, and eleventh input associated with the results of said instructions to test the portion of the audio data. The tenth input may specify at least one threshold for the audio data.

In yet another aspect, an ETMP for test monitoring output channels from an MCDN includes a plurality of MHDs configured as selectable UUTs and configured to output MCDN channels, and at least one ETMP executor configured to execute predetermined ETMP test programs. The ETMP test programs may include instructions executable to select one of the plurality of MHDs as a current UUT, acquire, at a predetermined frame rate, a selected baseband video signal output by the current UUT, select an image in a series of frame images, apply a predetermined image mask to the selected image, test a masked portion for a given video check point condition, and record the results of said instructions to test the masked portion. The series of frame images may be generated according to the frame rate. The masked portion of the selected image may be isolated when the image mask is applied.

In some embodiments, the ETMP may further include at least one ETMP configurator configured to generate new ETMP test programs, an ETMP database for storing ETMP test programs and test results, and an ETMP network configured to connect the MHDs, the ETMP executor(s), the ETMP configurator(s), and the ETMP database. The ETMP may further include a first means coupled to the ETMP network for controlling power supplied to the selected UUT in response to receiving a network power control command associated with the ETMP test program. The ETMP may also include a second means coupled to the ETMP network for selecting an MCDN channel for the baseband video signal in response to receiving a channel selection command associated with the ETMP test program. The ETMP may still further include a third means for routing a plurality of baseband video signals from the plurality of MHDs to the at least one ETMP executor. The third means may be a video matrix switch coupled to the ETMP network and configured to selectively switch the plurality of baseband signals to any one or more of a plurality of video grabber inputs associated with the at least one ETMP executor, in response to receiving a network video switch command associated with the ETMP test program.

In given embodiments, the ETMP may further include an ETMP master controller coupled to the ETMP network. The ETMP master controller may be configured to receive a control request from an ETMP executor to access a selected UUT, in response to receiving the control request, and assign control of the selected UUT to the ETMP executor. The ETMP executor may be permitted to access the selected UUT when control is assigned. When the ETMP executor is assigned the selected UUT, the ETMP master controller may be configured to deny subsequent control requests for the assigned UUT. When the ETMP executor is finished accessing the selected UUT, the ETMP master controller may be configured to release the assigned UUT.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of an MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-$n$, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 175, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 175 (see also FIG. 4).

In FIG. 1, backbone network 175 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 175 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is ETMP 170, which represents a facility for test monitoring of output channels of MCDN 100. ETMP 170 may include infrastructure for emulating functionality associated with clients 120 for the purpose of capturing and analyzing output video and/or audio signals in order to test the performance and quality of video assets provided by MCDN 100 (see also FIG. 2).

It is noted that clients 120 may include network appliances collectively referred to herein as customer premises equipment (CPE). In various embodiments, CPE may include the following devices: a gateway (GW), an MHD (see also FIG. 3), and a display device (not shown in FIG. 1). Any combination of the GW, the MHD, and the display device may be integrated into a single physical device. Thus, for example, CPE might include a single physical device that integrates the GW, MHD, and a display device. As another example, an MHD may be integrated into a display device, while the GW may be housed within a physically separate device.

The GW may provide connectivity for client 120 to access network 130. The GW may provide an interface and conversion function between access network 130 and a client-side local area network (LAN). The GW may include elements of a conventional DSL or cable modem. In some embodiments, the GW may further include routing functionality for routing multimedia content, conventional data content, or a combination of both in compliance with IP or another network layer protocol. In some embodiments, the LAN may encompass or represent an IEEE 802.3 (Ethernet) LAN, an IEEE 802.11-type (WiFi) LAN, or a combination thereof. The GW may still further include WiFi or another type of wireless access point to extend the LAN to wireless-capable devices in proximity to the GW. The GW may also provide a firewall (not depicted) between clients 120 and access network 130.

Clients 120 may further include a display device or, more simply, a display (not shown in FIG. 1). The display may be implemented as a TV, a liquid crystal display screen, a computer monitor, or the like. The display 126 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. The display may include one or more integrated speakers to play audio content.

Clients 120 may further include respective remote control (not shown in FIG. 1), which is configured to control the operation of MHD by means of a user interface, such as EPG 316 (see FIG. 3) that may be displayed by the display. The remote control of client 120 may be operable to communicate requests or commands wirelessly to the MHD using infrared (IR) or radio frequency (RF) signals. MHDs may also receive requests or commands via buttons located on side panels of MHDs.

The MHD may be enabled and configured to process incoming multimedia signals to produce audio and visual signals suitable for delivery to the display and any optional external speakers. Incoming multimedia signals received by the MHD may be compressed and/or encrypted, digital or analog, packetized for delivery over packet-switched embodiments of access network 130 or modulated for delivery over cable-based access networks. In some embodiments, the MHD may be implemented as a stand-alone set top box suitable for use in a co-axial or IP-based MCDN.

Figure 2:
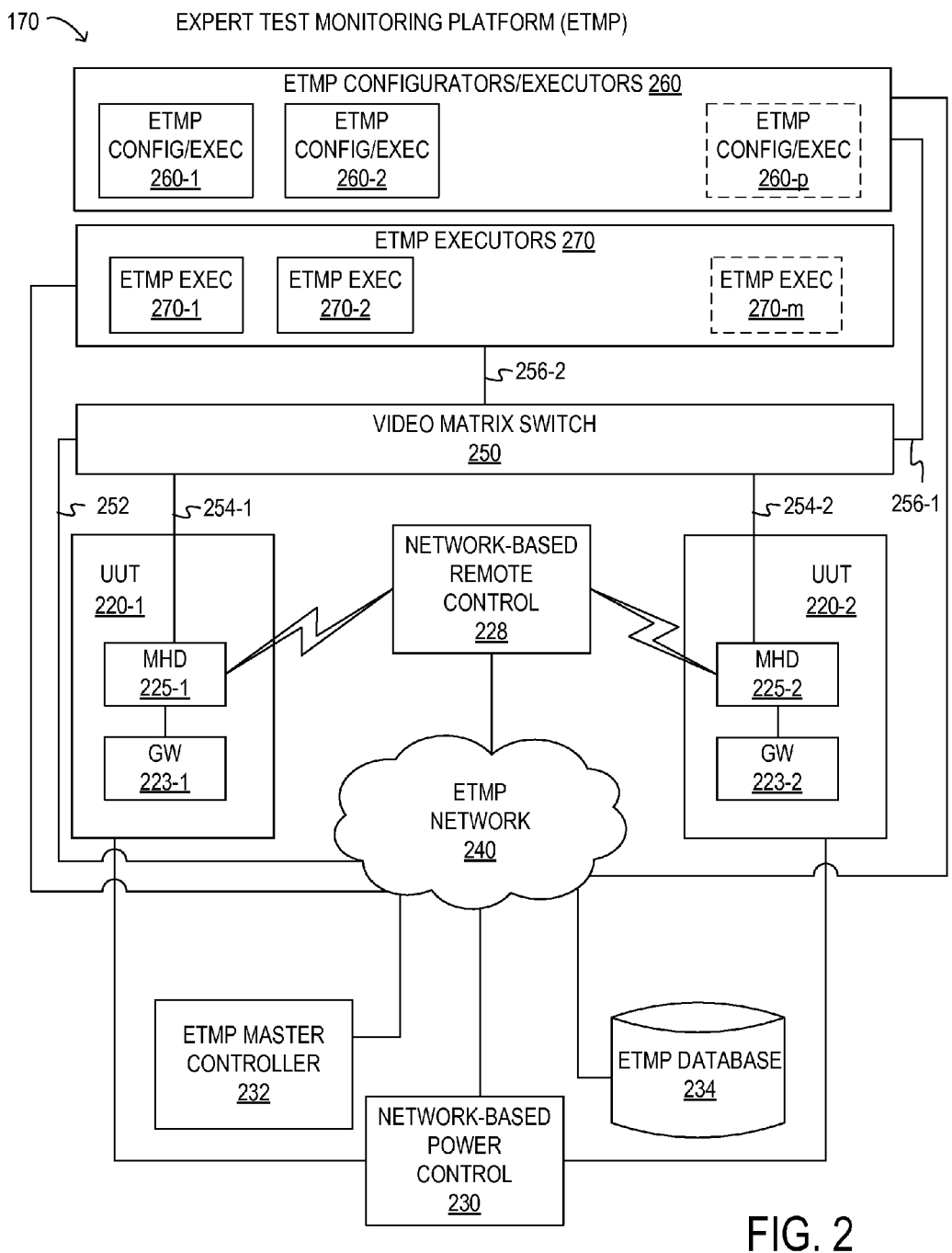
FIG. 2 is a block diagram of selected elements of an embodiment of an expert test monitoring platform (ETMP)

Referring now to FIG. 2, a block diagram illustrating selected elements of an embodiment of ETMP 170 is presented. In FIG. 2, ETMP network 240 is shown providing communication links between various elements in ETMP 170, as will now be described in detail. It is noted that ETMP network 240 may also link ETMP 170 to switching network 140 (not shown in FIG. 2, see FIG. 1). Also shown in FIG. 2 are UUTs 220, which may represent similar elements as CPE associated with clients 120, as described previously. In FIG. 1, UUT 220-1 and 220-2 are shown as two exemplary instances for clarity, while it will be understood that ETMP 170 may include different numbers of UUT 220 in various embodiments. UUT 220 may represent an embodiment of client 120 that is implemented in ETMP 170 for the purposes of testing and analyzing output channels of MCDN 100. Accordingly, UUT 220 may provide similar functionality as client 120, but may omit certain elements that are not relevant for testing purposes (see also FIG. 3). For example, UUT 220 may not include a display. In FIG. 2, UUT 220-1 may include MHD 225-1 and GW 223-1, as described previously (see also FIG. 3), while UUT 220-2 may include MHD 225-2 and GW 223-2.

As depicted in FIG. 2, network-based remote control 228 may represent a means to generate remote control signals for reception by MHD 225. Network-based remote control 228 may be configured to receive network commands that are addressed to a specific remote control port (not shown in FIG. 2) associated with a particular MHD 225, such as MHD 225-1. In this manner, network-based remote control 228 may provide functionality to emulate a remote control operated by a user of client 120 (see FIG. 1). Network commands sent to network-based remote control 228 may originate from a test operator of ETMP 170 or from an ETMP test program that is configured to execute in an automated manner.

Also shown in FIG. 2, network-based power control 230 may represent a means to control (i.e., switch) power to UUT 220, including to MHD 225, GW 223, and/or other elements. Network-based power control 230 may be configured to receive network commands that are addressed to a specific power circuit associated with a particular UUT 220. In this manner, network-based power control 230 may provide programmable switching capability to power down and power up UUT 220 and associated elements. Network commands sent to network-based power control 230 may originate from a test operator of ETMP 170 or from an ETMP test program, as will be described in detail below.

On the operational side of ETMP 170 in FIG. 2 are ETMP configurators/executors 260 and ETMP executors 270. A "configurator" refers to a module that allows an operator (not shown in FIG. 2) to perform individual test operations, generate test sequences, obtain test results, and otherwise manually operate a test facility. An ETMP configurator is therefore specific to ETMP 170. An "executor" refers to a module that is configured to execute previously stored test sequences, also referred to as test programs, jobs, batch files, scripts, etc., comprised of individual test operations or test instructions. An ETMP executor is specific to ETMP 170. Both ETMP configurators/executors 260 represent configurator modules that are executable on a computing device coupled to ETMP 170, which also may include executor functionality. ETMP executors 270 represent executor modules that do not include configurator functionality. ETMP 170 may include ETMP configurators/executors 260-1, 260-2 and so on, up to an arbitrary p-number of ETMP configurators/executors 260-$p$. ETMP 170 may include ETMP executors 270-1, 270-2 and so on, up to an arbitrary m-number of ETMP executors 270-$m$.

Additionally, in FIG. 2, video matrix switch 250 is shown providing connectivity between MHDs 225 and ETMP configurators/executors 260 and ETMP executors 270. Video matrix switch 250 may receive network commands via link 252 to ETMP network 240. Video matrix switch 250 may couple to output baseband video signals from MHD 225 via links 254. Specifically, video matrix switch 250 may receive an output signal from MHD 225-1 via link 254-1 and from MHD 225-2 via link 254-2. Furthermore, video matrix switch 250 may be coupled to inputs of ETMP configurators/executors 260 via link 256-1 and to inputs of ETMP executors 270 via link 256-2. It is noted that links 256 may represent multiple connections that form one edge of a switching matrix, while links 254 represent another edge of the switching matrix.

Also shown in FIG. 2 is ETMP master controller 232, which represents a functional module configured to manage access to resources of ETMP 170. ETMP master controller 232 may be configured to receive control requests for access to ETMP resources (such as UUTs 220 and associated elements in ETMP 170) from ETMP configurators or executors. For example, ETMP executor 270-1 may send a control request for access to UUT 220-2 from ETMP master controller 232, which may then grant the control request and assign control to ETMP executor 270-1. Subsequent requests for access to UUT 220-2 may then be denied by ETMP master controller 232, so long as ETMP executor 270-1 is assigned control of UUT 220-2. In certain embodiments, ETMP master controller 232 may take a priority of an ETMP test program into consideration when granting control requests to access ETMP resources and may terminate a currently assigned control relationship in favor of a higher priority one. In one embodiment, a scheduled ETMP test program may be assigned to ETMP executor 270-2 when a scheduled start time approaches the current time. The scheduled ETMP test program may be designated for UUT 220-2, which may be assigned for control by ETMP configurator/executor 260-1. In such an instance, ETMP master controller 232 may be configured to reassign control of UUT 220-2 to ETMP executor 270-2 and terminate the assignment of ETMP configurator/executor 260-1. A user of ETMP configurator/executor 260-1 may be given a warning by ETMP master controller 232 that a scheduled test is about to begin on UUT 220-2 and that a presently active test session will soon be terminated.

Finally, in FIG. 2, ETMP database 234 may represent a repository for data and information associated with ETMP 170. For example, ETMP database 234 may store configuration information representing ETMP resources, including network addresses and connection information for UUTs 220, video matrix switch 250, ETMP configurators/executors 260, ETMP executors 270, network-based remote control 228 and network-based power control 230. In various embodiments, ETMP master controller 232 may query ETMP database 234 for such information when managing control requests for ETMP resources. ETMP database 234 may further store ETMP test programs, as well as results of executed ETMP test programs and test operations. It is noted that various other elements in ETMP 170 may be configured to access ETMP database 234, as desired.

Figure 7:
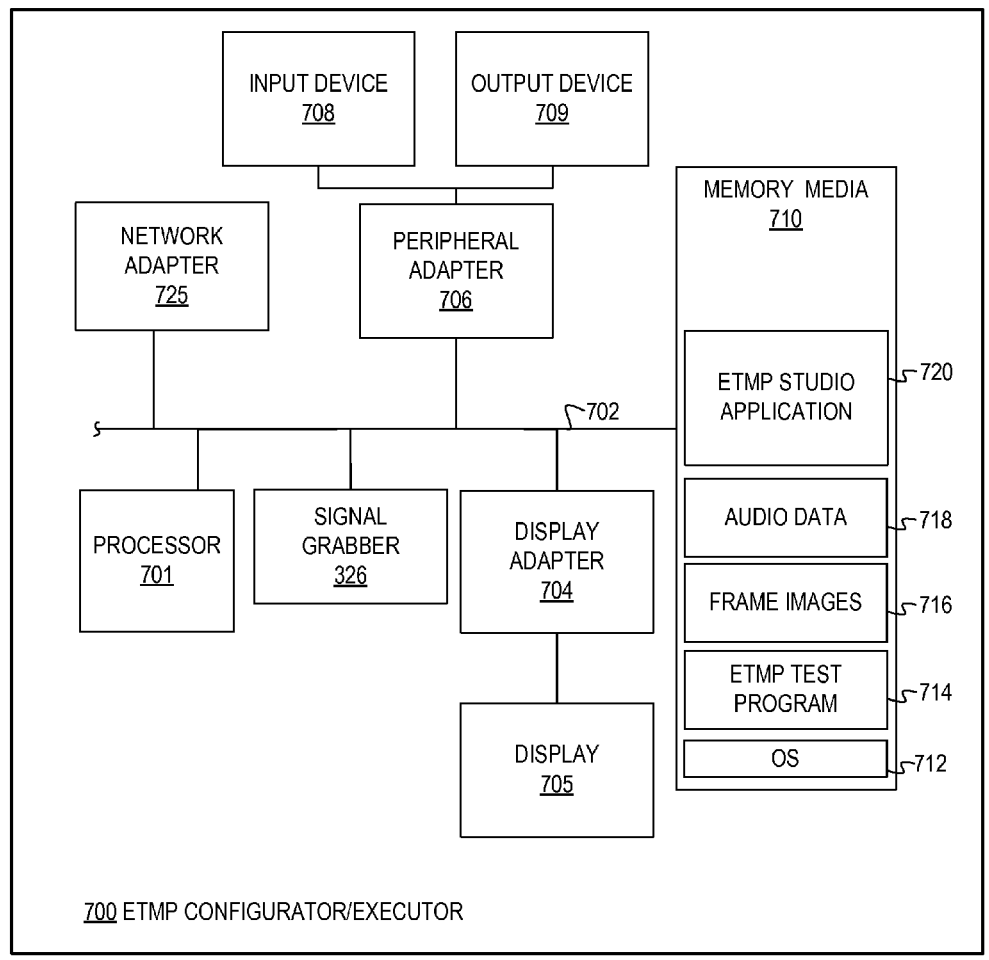
FIG. 7 is a block diagram of selected elements of an embodiment of an ETMP configurator/executor.

In operation of ETMP 170, a user may access ETMP configurator/executor 260-1 to perform test operations on UUT 220-1 (see also ETMP studio application 720 in FIG. 7). The user may first send a control request to ETMP master controller 232 for access to UUT 220-1. After the control request has been approved and access to UUT 220-1 has been assigned to ETMP configurator/executor 260-1, ETMP configurator/executor 260-1 may query ETMP database 234 for network addresses and configuration information associated with UUT 220-1. Using a queried network address, the user may send a network command using ETMP configurator/executor 260-1 to network-based power control 230 to power up UUT 220-1. ETMP configurator/executor 260-1 may also be used to send a network command to network-based remote control 228 to select a particular video channel for output by UUT 220-1 (i.e., MHD 225-1). ETMP configurator/executor 260-1 may also be used to send a network command to video matrix switch 250 to switch link 254-1 (an output from MHD 225-1) to an input of ETMP configurator/executor 260-1 via link 256-1. The input to ETMP configurator/executor 260-1 may be at signal grabber 326 (see FIGS. 3 and 7), which may be configured to acquire a video and/or audio portion of the selected video channel that has been routed via video matrix switch 250. The acquired audio/video may be used to perform a test operation, which may generate a test result, as will be described in detail below. The user may also activate recording of test operations performed using ETMP configurator/executor 260-1. The recorded test operations may be stored in ETMP database 234 as an ETMP test program, that may be retrieved at a later time and executed using ETMP executor 270.

In given embodiments, the test operation may involve a test of a particular region of the video output. The user may specify an image mask to determine the particular region associated with the test operation, as well as a test criteria for the test operation. When the image mask is applied, a masked area of a video image is isolated and used for the test operation. The test criteria may involve testing for a dynamic or a static image, whereby a test may be a negative or a positive test. Such a video test operation may also be referred to as a "video check point." The test operation may also involve a test of an audio component of the selected video channel. For example, acquired audio data may be compared to a threshold value to generate an audio test result. Such an audio test operation may be referred to as an "audio check point."

It is noted that multiple video check points and/or audio check points for a given MCDN channel may be configured by ETMP configurator/executor 260. After an audio/video check point is performed, a result of the check point may be logged at ETMP database 234. Depending on the result of the check point, a set of predetermined tasks may be performed when the check point fails or when the check point passes. A video check point may further include various additional parameters, such as any one or more of: a frame rate for the acquisition of the video images; a selection of an MCDN channel; a duration or other value indicating a series of images; values for defining the image mask; a type of video check point test or a video check point condition; and a destination address for the video check point results. It is noted that the image mask may be of various sizes, positions and shapes, including polygons and ellipses. The value indicating the series of images may include input specifying a series of dynamic or static images. An audio check point may further include various additional parameters, such as any one or more of: a sampling rate; a number of acquired audio tracks; a duration or other value indicating a portion of the audio data; a type of audio check point test or an audio check point condition; and a destination address (and/or other information) associated with the audio check point results. The audio check point condition may further specify at least one threshold for the audio data.

As examples, a static image video check point may include processing live incoming video frames and comparing one or more of the incoming frames against a known targeted "Golden" region image to see if there is a match. In one case, the threshold for recognizing a match may be a user specified value from 0 (no similarity) to 1 (perfect match). Some implementations may employ a threshold value of 0.95 for detecting a match. A dynamic image video check point may refer to a process in which live incoming frames are processed to determine if the video is "flowing" or "freezing" by comparing a current frame to the next frame over a user specified duration of time. In one case, the check point may include comparing the current frame to the next frame to determine if a test condition has been met. For instance, to check for video freeze, the user may specify a threshold also from 0 (no match) to 1 (perfect match) from one frame to the next. This threshold may then be used to compare sequentially adjacent frames over a user specified duration, e.g., 10 seconds, to see if the images are the same. Using, as an example, a threshold of 0.999, a test duration of approximately 10 seconds, and a frame rate of 2 fps, there would have to be at least 20 consecutive frames (2 fps*10) that are substantially identical (threshold greater than or equal to 0.999) before a freeze is indicated. For an audio detection check point, similar principles would apply. In the case of audio, left and right audio decibel values may be monitored for each video frame. The user in this case may specify audio decibel thresholds for the left and right audio levels for a specified period of time to identify valid audio or the lack of it, i.e., audio cutoff or no audio. For example, to detect an audio cutoff, one embodiment of an audio check point test might specify left and right audio threshold values of −60 dB. If the left and right audio monitored values exceed the threshold for a specified duration, no audio cutoff is indicated. Other embodiments and implementations may employ audio and video check points using different criteria including different threshold values, different durations, and so forth.

Figure 3:
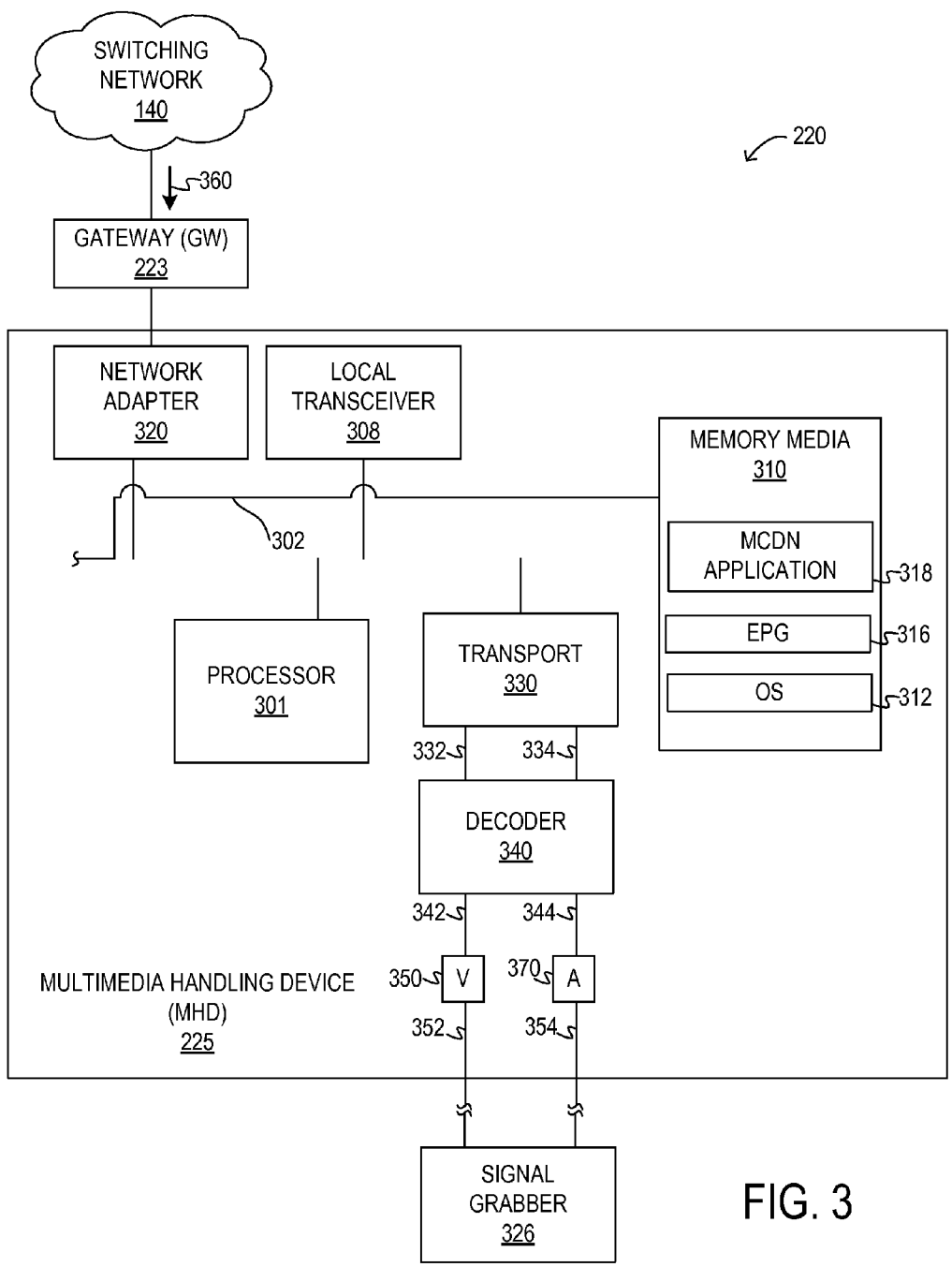
FIG. 3 is a block diagram of selected elements of an embodiment of a multimedia handling device (MHD)

Referring now to FIG. 3, a block diagram illustrating selected elements of an embodiment of UUT 220, including further details of MHD 225, is presented. In FIG. 3, MHD 225 is shown as a functional component of UUT 220 along with GW 223, which is shown receiving multimedia content 360 from switching network 140. It is noted that UUT 220 may represent functionality similar to that provided to clients 120 and, in particular, may receive substantially the same multimedia content 360, as received by clients 120 (see FIG. 1). In this manner, UUT 220 may serve as a realistic and accurate representation of clients 120 within ETMP 170 for test monitoring purposes, as described herein.

In the embodiment depicted in FIG. 3, MHD 225 includes processor 301 coupled via shared bus 302 to storage media, collectively identified as memory media 310. MHD 225, as depicted in FIG. 3, further includes network adapter 320 that interfaces MHD 225 to switching network 140 via GW 223 and through which MHD 225 receives multimedia content 360. GW 223 is shown providing a bridge to switching network 140, and receiving multimedia content 360 from switching network 140.

In embodiments suitable for use in IP-based content delivery networks, MHD 225, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, other tuning resources (not explicitly depicted in FIG. 3) may be used to "filter" desired content from other content that is delivered over the coaxial medium simultaneously and these tuners may be provided in MHD 225. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce video and audio signals 352 and 354 in a format compliant with a display, as mentioned previously. Since MHD 225 is configured for test monitoring within ETMP 170, a display may be omitted from UUT 220. Video and audio signals 352 and 354, which may be referred in aggregate to as the "baseband video signal," may represent analog signals, digital signals, or a combination thereof, in different embodiments. In FIG. 3, video and audio signals 352 and 354 are shown being ultimately routed to signal grabber 326 (see also FIG. 7), which may be associated with ETMP configurator/executor 260 and/or ETMP executor 270. The routing of video and audio signals 352 and 354 may be accomplished using video matrix switch 250 (see FIG. 2), as described above.

Memory media 310 encompasses persistent and volatile media, fixed and removable media, and magnetic and semiconductor media. Memory media 310 is operable to store instructions, data, or both. Memory media 310 as shown may include sets or sequences of instructions and/or data, namely, an operating system 312, EPG 316, and MCDN application 318. Operating system 312 may be a UNIX or UNIX-like operating system, a Windows® family operating system, or another suitable operating system. In some embodiments, memory media 310 is configured to store and execute instructions provided as services to UUT 220 by application server 150, as mentioned previously. For example, MCDN application 318 may represent a combination of various sources of multimedia content that have been combined and generated as an output channel by application server 150 (see also FIG. 4).

EPG 316 represents a guide to the multimedia content provided to UUT 220 via MCDN 100, and may be output as an element of the user interface. The user interface may include a plurality of menu items arranged according to one or more menu layouts, which enable operation of MHD 225 using a remote control.

Local transceiver 308 represents an interface of MHD 225 for communicating with external devices, such as a remote control or network-based remote control 228 (see FIG. 2). Local transceiver 308 may provide a mechanical interface for coupling to an external device, such as a plug, socket, or other proximal adapter. In some cases, local transceiver 308 is a wireless transceiver, configured to send and receive IR or RF or other signals. In some implementations local transceiver 308 receives IR or RF signals, but does not transmit IR or RF signals, i.e., local transceiver 308 may be a receiver. Local transceiver 308 may be accessed by a remote control module (not shown in FIG. 3) for providing remote control functionality. In some embodiments, local transceiver 308 may include WiFi functionality.

Figure 4:
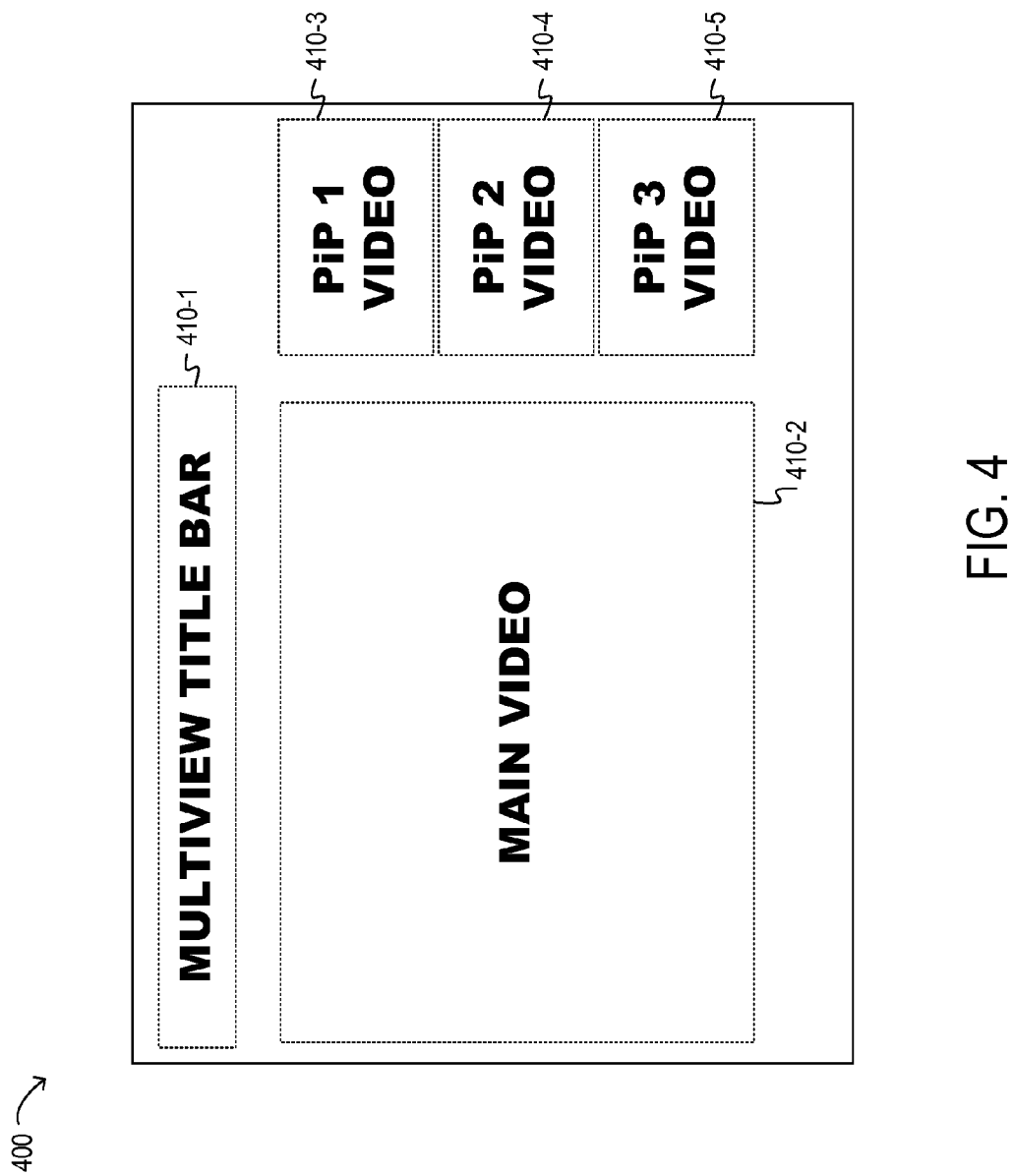
FIG. 4 is a block diagram of selected elements of an embodiment of a video asset.

Turning now to FIG. 4, a block diagram of selected elements of an embodiment of output video channel 400, representing a video asset associated with MCDN 100, is depicted. Output video channel 400 may be generated by MHD 225 in response to receiving a channel selection command, for example, via local transceiver 308 (see FIG. 3). Output video channel 400 may include an image portion and a correspondingly synchronized audio portion (not shown in FIG. 4). Output video channel 400 may correspond to a multiview output generated by MCDN application 318 (see FIG. 3). In the example implementation shown in FIG. 4, output video channel 400 may comprise various video elements, including a multiview title bar, a main video, and several picture-in-picture (PiP) videos. Other video and image elements may be implemented in various embodiments of MCDN application 318 and/or output video channel 400.

Output video channel 400 may be associated with one or more video check points, as described above with respect to FIG. 2. A video check point may be associated with image mask 410, which isolates a portion of output video channel 400. As shown in FIG. 4, image mask 410-1 may be used to isolate a multiview title bar, or other text section of output video channel 400. Image mask 410-2 may be used to isolate a main video portion of output video channel 400, which may also be associated with the audio portion of output video channel 400. Image mask 410-3 may be used to isolate a first PiP portion of output video channel 400. Image mask 410-4 may be used to isolate a second PiP portion of output video channel 400. Image mask 410-5 may be used to isolate a third PiP portion of output video channel 400. Each image mask 410 may accordingly be associated with a video check point. For example, a first video check point may specify image mask 410-1 and a static image corresponding to the multiview title bar. A second video check point may specify image mask 410-2 and a dynamic image corresponding to the main video.

Figure 5:
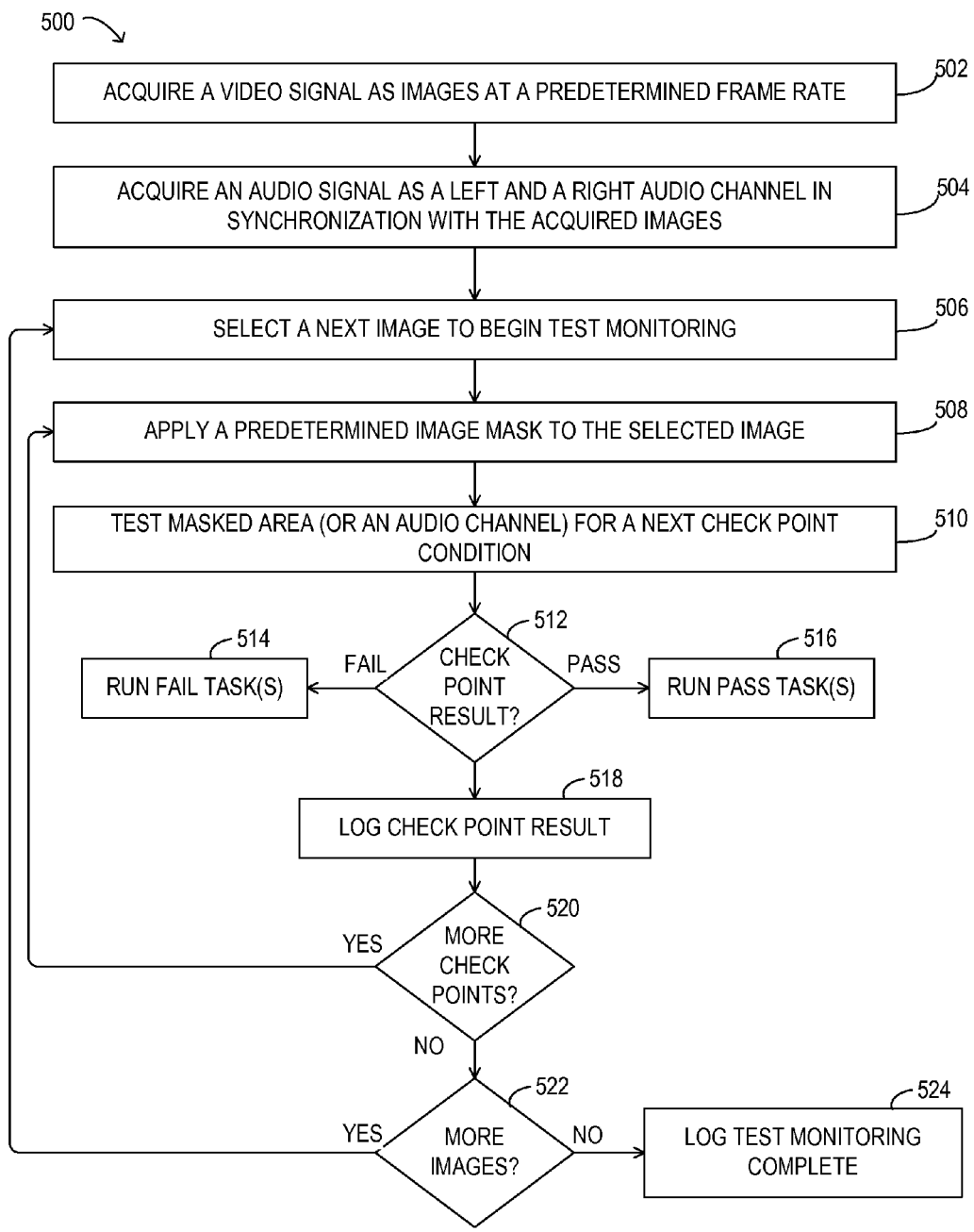
FIG. 5 illustrates selected elements of an embodiment of an MCDN test monitoring method.

Turning now to FIG. 5, selected elements of an embodiment of a method 500 for test monitoring of MCDN output channels are illustrated in flow chart form. In one embodiment, method 500 may be performed by ETMP 170 (see FIGS. 1, 2). In particular, method 500 may represent an example of an audio/video check point, as described above. It is noted that certain operations described in method 500 may be optional or may be rearranged in different embodiments.

In method 500, a video signal is acquired as images at a predetermined frame rate (operation 502). The images may be acquired as a series of images. An audio signal may be acquired as a left and a right audio channel in synchronization with the acquired images (operation 504). The audio signal and the video signal may represent a baseband video signal generated by an MHD of an MCDN in response to a channel selection at the MHD. A next image may be selected to begin test monitoring (operation 506). A video check point may be applied to the selected image. An audio check point may use the selected image as a mark in time for synchronizing desired audio data. A predetermined image mask may be applied to the selected image (operation 508). It is noted that in case of an audio check point, operation 508 may be omitted in certain embodiments. The masked area (or an audio channel) may be tested for a next check point condition (operation 510). A video check point may involve testing the masked area for a video criteria, such as a dynamic or a static image. An audio check point may involve testing for an audio criteria, such as a comparison with an audio threshold.

Next in method 500, a determination may be made with regard to the result of the check point (operation 512). The determination may be made in view of the check point condition in operation 510. When the check point result in operation 512 is FAIL, one or more fail tasks may be run (operation 514). When the check point in operation 512 result is PASS, one or more pass tasks may be run (operation 516). The fail tasks and the pass tasks may be defined in advance and associated with the check point condition in operation 510. Then, the check point result may be logged (operation 518). The check point result may include a video test log and/or an audio test log. The check point result may be logged in ETMP database 234 (see FIG. 2). Next a decision may be made whether additional check points remain (operation 520). When the result in operation 520 is YES, then method 500 may loop back to operation 508, from where additional check points may be applied to the selected image. When the result of operation 520 is NO, then a further decision may be made whether additional images are to be selected (operation 522). When the result of operation 522 is YES, then method 500 may loop back to operation 506, from where a next image may be selected. When the result of operation 522 is NO, then completion of test monitoring may be logged (operation 524).

Figure 6:
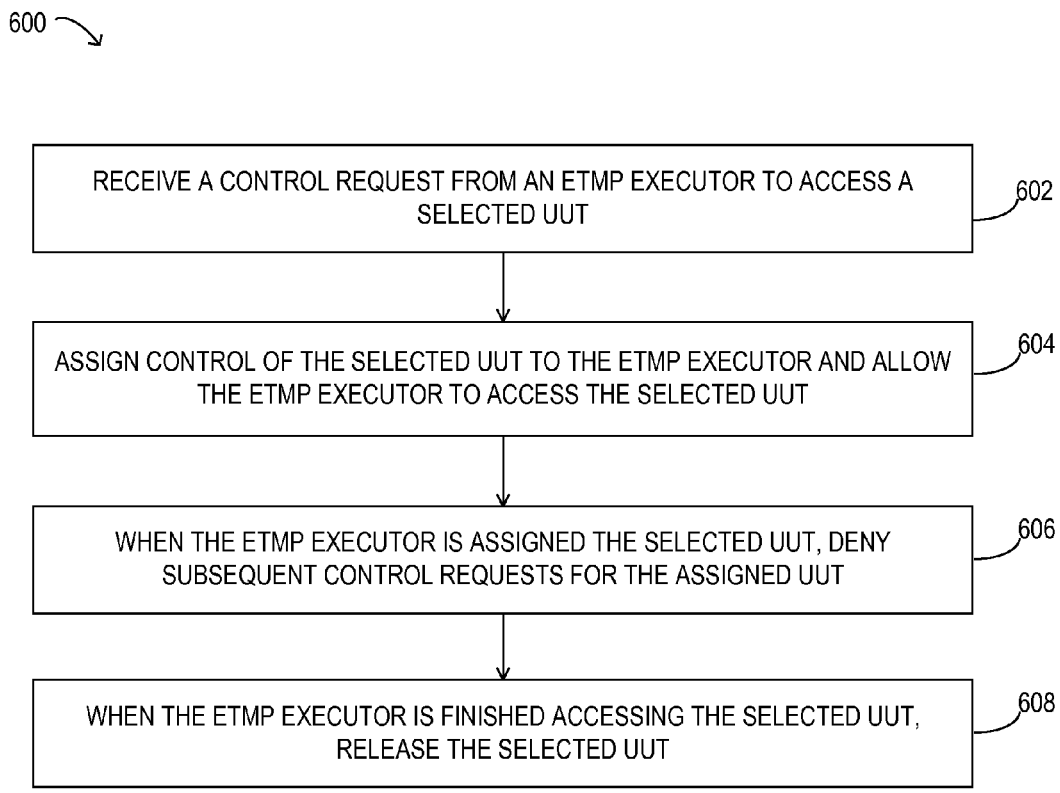
FIG. 6 illustrates selected elements of an embodiment of an MCDN test monitoring method.

Turning now to FIG. 6, selected elements of an embodiment of method 600 for test monitoring are illustrated in flow chart form. In one embodiment, method 600 may be performed by ETMP master controller 232 (see FIG. 2) in conjunction with ETMP 170 (see FIGS. 1, 2). It is noted that certain operations described in method 600 may be optional or may be rearranged in different embodiments.

A control request from an ETMP executor may be received to access a selected UUT (operation 602). In certain embodiments, the control request may be received from an ETMP configurator. Control of the selected UUT may be assigned to the ETMP executor and the ETMP executor is allowed to access the selected UUT (operation 604). When the ETMP executor is assigned the selected UUT, subsequent control requests for the assigned UUT may be denied (operation 606). When the ETMP executor is finished accessing the selected UUT, the selected UUT may be released (operation 608).

Referring now to FIG. 7, a block diagram illustrating selected elements of an embodiment of ETMP configurator/executor 700 is presented. ETMP configurator/executor 700 may represent ETMP configurator/executor 260 and/or ETMP executor 270 (see FIG. 2) in various embodiments. As shown in FIG. 2, multiple instances of ETMP configurator/executor 700 may be configured for use in conjunction with a given ETMP 170 facility. The elements of ETMP configurator/executor 700 depicted in FIG. 7 may be physically implemented as a single, self-contained device. In certain implementations, ETMP configurator/executor 700 may alternatively be implemented using a number of different devices that are physically separated, but coupled together for centralized control. It is noted that ETMP configurator/executor 700 may include additional components, such as a power supply and a cooling element, which have been omitted from FIG. 7 for clarity. As shown in FIG. 7, ETMP configurator/executor 700 may operate in conjunction with ETMP 170 (see also FIGS. 1 and 3) to execute the methods and operations described herein. In certain embodiments, ETMP configurator/executor 700 may represent a virtualized computing environment, wherein certain elements depicted in FIG. 7 are shared or represent virtualized components.

In the embodiment depicted in FIG. 7, ETMP configurator/executor 700 includes processor 701 coupled via shared bus 702 to storage media collectively identified as memory media 710. ETMP configurator/executor 700, as depicted in FIG. 7, further includes network adapter 725 that interfaces ETMP configurator/executor 700 to a network (not shown in FIG. 7), such as ETMP network 240 (see FIG. 2). In embodiments suitable for use with ETMP 170, ETMP configurator/executor 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

ETMP configurator/executor 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a television or the like. Display 705 may comply with a display standard for computer monitors and/or television displays. Standards for computer monitors include analog standards such as VGA, XGA, etc., or digital standards such as DVI and HDMI, among others. A television display may comply with standards such as NTSC, PAL, or another suitable standard. Display 705 may include one or more integrated speakers to play audio content.

Memory media 710 encompasses persistent and volatile media, fixed and removable media, and magnetic and semiconductor media. Memory media 710 is operable to store instructions, data, or both. Memory media 710 as shown includes sets or sequences of instructions, namely, an operating system 712, ETMP test program 714, frame images 716, audio data 718, and ETMP studio application 720. Operating system 712 may be a UNIX or UNIX-like operating system, a Windows® family operating system, or another suitable operating system. ETMP test program 714 may represent a sequence of test operations, as described previously. ETMP test program 714 may be generated using ETMP studio application 720, which may provide ETMP configurator functionality. ETMP test program 714 may also be executed using ETMP executor functionality. Frame images 716 may represent image data stored when acquiring a baseband video signal using signal grabber 326. Audio data 718 may represent audio signals from an audio portion of a baseband video signal acquired using signal grabber 326.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A test method, comprising:
   requesting, from a test monitor controller, access to a multimedia handling device as an active unit under test;
   controlling power supplied to the active unit under test by sending a first network command to a network-based power controller;
   selecting a video signal including a plurality of video elements, each of the plurality of video elements associated with a corresponding region of a video frame, by sending a second network command to generate a remote control signal instructing the active unit under test to output a multimedia content channel;
   configuring a video matrix switch to route the video signal from the active unit under test;
   accessing a first image mask defining a first video frame region;
   performing a masked video check point for a first video element of the plurality of video elements, wherein the masked video check point compares the first video frame region of a first frame to the first video frame region of a second frame; and
   based on a result of the masked video check point:
      executing a first script in response to the masked video check point passing; and
      executing a second script in response to the masked video check point failing.

2. The method of claim 1, wherein performing the masked video check point includes:
   determining that the first video element is intended as a static image responsive to identifying the first video element as being static; and
   determining that the first video element is intended as a dynamic image responsive to identifying the first video element as being dynamic.

3. The method of claim 1, wherein the first video element comprises a main video element and wherein the first image mask comprises a main video mask indicative of a region of the video frame associated with a location of the main video element.

4. The method of claim 3, wherein the main video element includes a main video component and a main audio component and wherein performing the masked video check point includes verifying that the main audio component is dynamic.

5. The method of claim 1, wherein the first video element comprises a static title bar element and wherein the first image mask comprises a title bar mask indicative of a region of the video frame associated with a location of the title bar.

6. The method of claim 1, wherein the plurality of video elements includes a plurality of dynamic picture-in-picture elements.

7. The method of claim 6, further comprising:
   accessing a plurality of picture-in-picture image masks defining regions corresponding to each of the plurality of picture-in-picture elements; and
   performing masked video check points for each of the picture-in-picture elements to verify each of the picture-in-picture elements as being dynamic.

8. The method of claim 1, further comprising:
   selecting a rate at which frame images are generated from the video signal.

9. A test executor system, comprising:
   a processor;
   computer readable storage, accessible to the processor, including processor executable program instructions, which when executed by the processor, cause the processor to perform operations comprising:
      requesting, from a test monitor controller, access to a multimedia handling device as an active unit under test;
      controlling power supplied to the active unit under test by sending a first network command to a network-based power controller;
      selecting a video signal including a plurality of video elements, each of the plurality of video elements associated with a corresponding region of a video frame, by sending a second network command to generate a remote control signal instructing the active unit under test to output a multimedia content channel;
      configuring a video matrix switch to route the video signal from the active unit under test;
      accessing a first image mask defining a first video frame region;
      performing a masked video check point for a first video element of the plurality of video elements, wherein the masked video check point compares the first video frame region of a first frame to the first video frame region of a second frame; and
      based on a result of the masked video check point:
         executing a first script in response to the masked video check point passing; and
         executing a second script in response to the masked video check point failing.

10. The test executor system of claim 9, wherein performing the masked video check point includes:
    determining that the first video element is intended as a static image responsive to identifying the first video element as being static; and
    determining that the first video element is intended as a dynamic image responsive to identifying the first video element as being dynamic.

11. The test executor system of claim 9, wherein:
    the first video element comprises a main video element;
    the first image mask comprises a main video mask indicative of a region of the video frame associated with a location of the main video element;
    the main video element includes a main video component and a main audio component; and
    performing the masked video check point includes verifying that the main audio component is dynamic.

12. The test executor system of claim 9, wherein the plurality of video elements includes a plurality of dynamic picture-in-picture elements.

13. The test executor system of claim 12, wherein the operations include:
    accessing a plurality of picture-in-picture image masks defining regions corresponding to each of the plurality of picture-in-picture elements; and
    performing masked video check points for each of the picture-in-picture elements to verify each of the picture-in-picture elements as being dynamic.

14. A computer readable memory device including stored, processor executable instructions, which when executed by a processor, cause the processor to perform operations comprising:
    requesting, from a test monitor controller, access to a multimedia handling device as an active unit under test;
    controlling power supplied to the active unit under test by sending a first network command to a network-based power controller;
    selecting a video signal including a plurality of video elements, each of the plurality of video elements associated with a corresponding region of a video frame;

configuring a video matrix switch to route the video signal from the active unit under test;

accessing a first image mask defining a first video frame region;

performing a masked video check point for a first video element of the plurality of video elements, wherein the masked video check point compares the first video frame region of a first frame to the first video frame region of a second frame; and based on a result of the masked video check point:
executing a first script in response to the masked video check point passing; and
executing a second script in response to the masked video check point failing.

15. The computer readable memory device of claim 14, wherein performing the masked video check point includes:
determining that the first video element is intended as a static image responsive to identifying the first video element as being static; and
determining that the first video element is intended as a dynamic image responsive to identifying the first video element as being dynamic.

16. The computer readable memory device of claim 14, wherein:
the first video element comprises a main video element;
the first image mask comprises a main video mask indicative of a region of the video frame associated with a location of the main video element;
the main video element includes a main video component and a main audio component; and
performing the masked video check point includes verifying that the main audio component is dynamic.

17. The computer readable memory device of claim 14, wherein the plurality of video elements includes a plurality of dynamic picture-in-picture elements.

18. The computer readable medium memory device of claim 17, wherein the operations include:
accessing a plurality of picture-in-picture image masks defining regions corresponding to each of the plurality of picture-in-picture elements; and
performing masked video check points for each of the picture-in-picture elements to verify each of the picture-in-picture elements as being dynamic.

19. The computer readable memory device of claim 14, wherein the operations include:
selecting a rate at which frame images are generated from the video signal.

20. The computer readable memory device of claim 14, wherein selecting the video signal includes:
sending a second network command to generate a remote control signal instructing the active unit under test to output a multimedia content channel.

* * * * *